United States Patent
Ngai

(10) Patent No.: US 7,480,303 B1
(45) Date of Patent: Jan. 20, 2009

(54) PSEUDO-ETHERNET SWITCH WITHOUT ETHERNET MEDIA-ACCESS-CONTROLLERS (MAC'S) THAT COPIES ETHERNET CONTEXT REGISTERS BETWEEN PCI-EXPRESS PORTS

(75) Inventor: Henry P. Ngai, Coto De Caza, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 710 days.

(21) Appl. No.: 10/908,515

(22) Filed: May 16, 2005

(51) Int. Cl.
*H04L 12/56* (2006.01)
*H04L 12/28* (2006.01)

(52) U.S. Cl. .................... 370/395.5; 370/401
(58) Field of Classification Search ............... 370/395.5, 370/401, 402, 422
See application file for complete search history.

(56) References Cited

U.S. PATENT DOCUMENTS

| | | | |
|---|---|---|---|
| 5,748,911 A | 5/1998 | Maguire et al. ............ 710/303 |
| 6,094,700 A | 7/2000 | Deschepper et al. ....... 710/313 |
| 6,101,188 A | 8/2000 | Sekine et al. ............... 370/401 |
| 6,151,651 A | 11/2000 | Hewitt et al. ............... 710/315 |
| 6,256,700 B1 | 7/2001 | Sauber ....................... 710/316 |
| 6,456,590 B1 | 9/2002 | Ren et al. ................... 370/229 |
| 6,577,625 B1 * | 6/2003 | Chiou et al. ................ 370/381 |
| 6,771,612 B1 | 8/2004 | Park ........................... 370/276 |
| 6,775,283 B1 | 8/2004 | Williams .................... 370/392 |
| 6,816,929 B2 | 11/2004 | Ueda ............................ 710/56 |
| 6,839,777 B1 | 1/2005 | Vrancic et al. ............... 710/52 |
| 6,874,042 B2 | 3/2005 | Sauber .......................... 710/38 |
| 6,885,677 B1 * | 4/2005 | Klevans ...................... 370/466 |
| 2003/0202520 A1 * | 10/2003 | Witkowski et al. .......... 370/400 |
| 2004/0252722 A1 | 12/2004 | Wybenga et al. ........... 370/474 |
| 2004/0268015 A1 | 12/2004 | Pettey et al. ................ 710/313 |
| 2005/0010709 A1 | 1/2005 | Davies et al. .............. 710/305 |
| 2005/0068964 A1 | 3/2005 | Wright ................... 370/395.21 |

* cited by examiner

*Primary Examiner*—Chirag G Shah
*Assistant Examiner*—Minh-Trang Nguyen
(74) *Attorney, Agent, or Firm*—Stuart T. Auvinen; gPatent LLC

(57) ABSTRACT

A Pseudo-Ethernet switch has a routing table that uses Ethernet media-access controller (MAC) addresses to route Ethernet packets through a switch fabric between an input port and an output port. However, the input port and output port have Peripheral Component Interconnect Express (PCIE) interfaces that read and write PCI-Express packets to and from host-processor memories. When used in a blade system, host processor boards have PCIE physical links that connect to the PCIE ports on the Pseudo-Ethernet switch. The Pseudo-Ethernet switch does not have Ethernet MAC and Ethernet physical layers, saving considerable hardware. The switch fabric can be a cross-bar switch or can be a shared memory that stores Ethernet packet data embedded in the PCIE packets. Write and read pointers for a buffer storing an Ethernet packet in the shared memory can be passed from input to output port to perform packet switching.

11 Claims, 11 Drawing Sheets

FIG. 8     100

FIG. 11
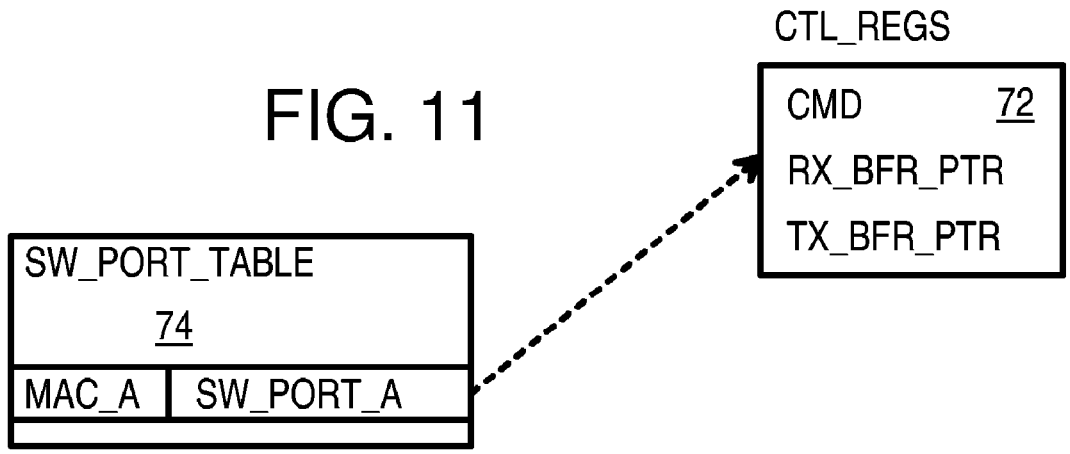
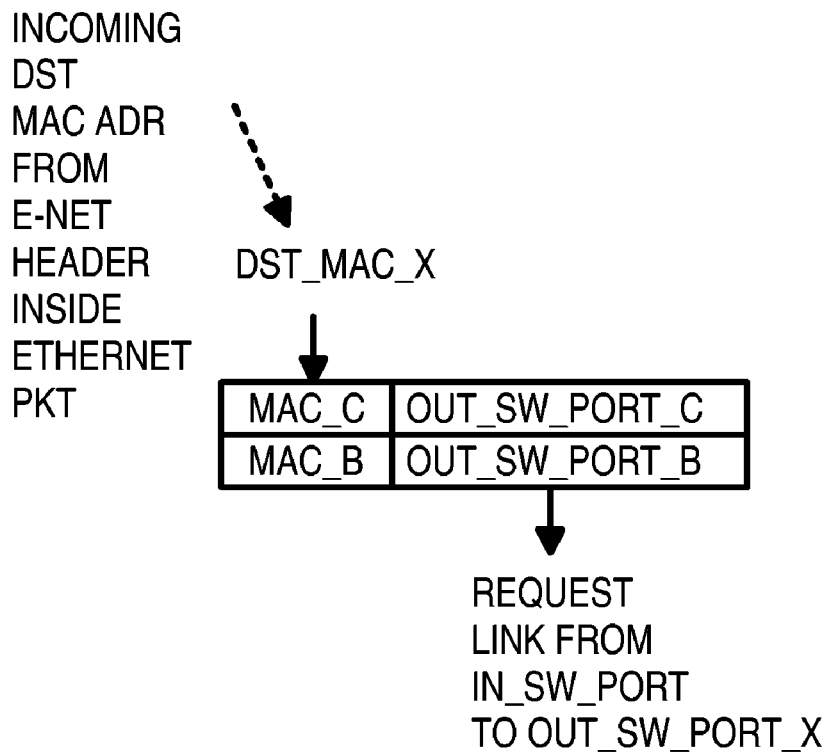
FIG. 12

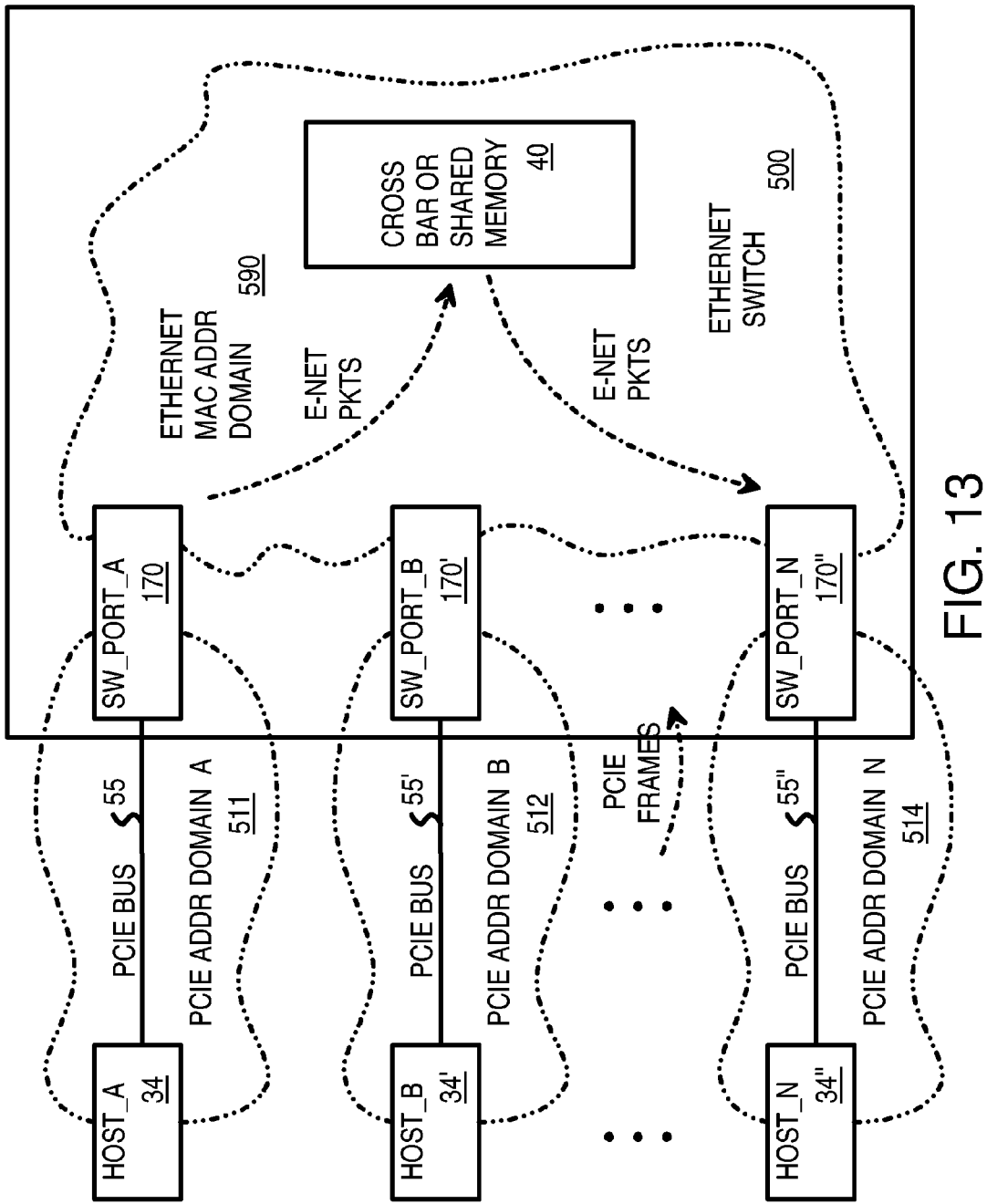

PSEUDO-ETHERNET SWITCH WITHOUT ETHERNET MEDIA-ACCESS-CONTROLLERS (MAC'S) THAT COPIES ETHERNET CONTEXT REGISTERS BETWEEN PCI-EXPRESS PORTS

FIELD OF THE INVENTION

This invention relates to network switches, and more particularly to switching Ethernet packets using Peripheral Component Interconnect Express (PCIE) ports.

BACKGROUND OF THE INVENTION

Today's networks have substantially increased the usefulness of computers such as personal computers (PC's). A local-area network (LAN) such as an Ethernet can connect several PC's together, and an Internet router or gateway on the Ethernet can allow all PC's to reach the larger Internet.

Peripherals and other devices such as keyboards and mice may be connected to an individual PC using smaller, less complex networks such as Peripheral Component Interconnect Express (PCIE) or Universal-Serial-Bus (USB). Such peripheral devices were traditionally daisy-chained together, but more recently USB hubs or PCIE switches are being used. These are often known as load-store buses since they operate within a single address domain, and write and read data or packets to and from memory addresses often using input and output CPU instructions or memory read and memory write CPU instructions.

FIG. 1 shows a PC connecting to peripherals using a PCIE switch. PCIE switch 20 has several ports that connect to PCIE links 22. Host processor 10, such as a processor on a PC, acts as the host or root controller for all PCIE transactions. PCIE media-access controller (MAC) 12 converts commands and data from host processor 10 to PCIE packets that are transmitted serially over PCIE link 22 to PCIE switch 20.

Similarly, each peripheral such as video 18, disk 14, and Ethernet NIC 16 has its own PCIE MAC 12 for communicating over a PCIE link 22 to PCIE switch 20. Video 18, disk 14, and Ethernet NIC 16 act as PCIE slave devices while host processor 10 acts as the master. Each PCIE link 22 has two pairs of signal wires that carry full-duplex differential data in both directions. Power and ground and a clock may also be present in cables for PCIE links 22.

PCIE switch 20 switches data among ports for PCIE links 22 as required.

While PCIE is useful, the PCIE standard allows for only one host with a single address space, or a single address domain. Different host computers typically each have their own address space or domain, and may use addresses within that domain without regard to use of these addresses in other address domains. Connecting two or more hosts together using PCIE is problematic and may required specialized hardware and software. Communication buffers such as I/O ports may be used between address domains. An extension of PCIE known as Advanced Switching (AS) may also be used.

FIG. 2 shows a blade server using an Ethernet switch to connect blades. A blade server typically has several computers located together on a common rack or chassis. An Ethernet switch may be located in one of the chassis slots in the blade server. Ethernet links are made between each blade computer and the Ethernet switch, allowing Ethernet communication among the blade's computers. An Ethernet network interface controller (NIC) may be located on the same board as a blade's processor and memory.

For example, blade A has processor 10 and Ethernet NIC 32 on first blade board 34. An economical blade system can be made by using a modified PC motherboard for each blade computer. First blade board 34 operates as a separate PC system, with processor 10 acting as the host processor. Communication with other blades and the outside world is primarily made using Ethernet NIC 32, and input, output, or peripheral devices connected to first blade board 34 are minimal or non-existent, or used only for diagnostics.

First blade board 34 connects to Ethernet switch 30 through Ethernet physical link 36, which can be a twisted-pair cable plugged into receptacles or jacks on first blade board 34 and on Ethernet switch 30, such as RJ-45 jacks, or an optical fiber, a wireless link or a differential copper trace on a PCB. Ethernet switch 30 contains many ports, while blade boards typically have only 1 port to connect to a first switch, and a second port as a redundant connection. Ethernet switch 30 typically resides on a removable board, a special slot designed for a switch.

Other blades on blade boards 34', 34", 34''' also have processors 10', 10", 10''' and Ethernet NIC's 32', 32", 32''' and connect to Ethernet switch 30 by Ethernet physical links 36', 36", 36''', respectively. Since Ethernet is a widely-used communication standard, inter-processor communication within a blade system is facilitated. Ethernet switch 30 may also have ports that connect to an external network such as a corporate local-area network (LAN) or a bridge to the Internet.

FIG. 3 illustrates in more detail Ethernet hardware in a blade system. Ethernet switch 30 is located in a blade system, such as in one of the chassis slots. Ethernet NIC's are located on each individual blade computer's board in the other chassis slots of the blade system. For example, blade A has Ethernet NIC 32 that connects to Ethernet switch 30 over Ethernet physical link 36, while blade C Ethernet NIC 32" that connects to Ethernet switch 30 over Ethernet physical link 36".

Each blade's host processor may communicate with it's Ethernet NIC over a local expansion bus such as PCI, PCIE, USB, or some other load-store bus. Host interface 38 receives commands and data from the host processor over this local bus, which may be stored in registers such as Ethernet control registers. Ethernet data may be located in a main memory used by the host processor, and these registers may contain pointers to the data that host interface 38 uses to read the data when an Ethernet packet is being assembled and transmitted.

The assembled data is stored by host interface 38 into blade packet FIFO 42, which is read by Ethernet media-access controller (MAC) 44 for transmission over blade Ethernet physical layer 46. Ethernet MAC 44 performs media-access layer functions such as checksum generation and either collision detection with re-transmission, or full-duplex throttle-back functions. Other functions may also be performed, such as comparing destination addresses of received packets and discarding packets mis-matching the controller's MAC destination address. Ethernet physical layer 46 contains the physical line drivers that drive serial data onto Ethernet physical link 36.

On Ethernet switch 30, switch Ethernet physical layer 48 contains circuits such as line receivers and clock re-generators to receive analog data and convert it to digital data. Switch Ethernet MAC 52 verifies checksums and removes low-level headers, writing the packet data into switch packet FIFO 54.

Switch logic 56 then determines the destination MAC address from the received Ethernet packet and requests a link be made through cross-bar 40 by switch controller 50. A routing table may be consulted by switch controller 50 to determine which switch port receives packets for that Ethernet MAC address. Switch controller 50 then instructs or configures cross-bar 40 to establish a connection from the input port to the output port on Ethernet switch 30. The Ethernet packet is then copied from the input port's switch packet FIFO 54 to the output port's switch packet FIFO 54'.

The Ethernet packet is then sent out the output port by Switch Ethernet MAC 52' reading from switch packet FIFO 54' and sending the Ethernet packet to another blade computer's Ethernet NIC 32' over another Ethernet physical link 36' using switch Ethernet physical layer 48'. The receiving blade B's Ethernet physical layer 46' receives the data from Ethernet physical link 36', sends the data up to Ethernet MAC 44' which writes it to blade packet FIFO 42'. Finally host interface 38' sends the data from the Ethernet packet to the blade processor or its memory. Thus blade A sends an Ethernet packet to blade B through Ethernet switch 30.

A shared memory may be used for cross-bar 40, or a hardware cross-bar switch may be used. Other implementations may also be used in various Ethernet switch architectures. When a shared memory is used, switch packet FIFO's 54, 54', 54" may be parts of the shared memory.

While blade systems with Ethernet switches are quite useful and widely used today, there is an inherent inefficiency in using Ethernet for communications among blade computers in a rack. Data to be exchanged among blade computers is stored in their local memories, converted to PCIE frames and copied to blade packet FIFO 42 over a local PCIE bus, then passes down through Ethernet MAC 44 and blade Ethernet physical layer 46, across Ethernet physical link 36 and back up through switch Ethernet physical layer 48 and Switch Ethernet MAC 52 before being switched through cross-bar 40.

Then the packet data goes back down through the switches' link and physical layers of Switch Ethernet MAC 52' and switch Ethernet physical layer 48', over Ethernet physical link 36', then back up blade Ethernet physical layer 46' and Ethernet MAC 44'. Then the data is carried over PCIE frames on the PCIE bus of blade B to the memory of blade B's processor.

Also, the Ethernet MAC's are often specific to a network speed, such as 10/100 for 10 mbps and 100 mbps, of 1 G for 1 Giga-bit-per-second, etc. As network speeds increase, upgrades to the MAC's are necessary.

What is desired is a more efficient Ethernet switch for blade systems. An Ethernet switch is desired that switches using Ethernet MAC addresses, yet connects to host computers in a more efficient manner.

BRIEF DESCRIPTION OF THE DRAWINGS

FIG. 11 shows Ethernet registers for a switch-port context.

FIG. 12 shows lookups in the switch routing table for Ethernet packets.

FIG. 13 highlights different address-space domains for PCI-Express buses from blade-processor boards to the Pseudo-Ethernet switch.

DETAILED DESCRIPTION

The present invention relates to an improvement in Ethernet switches. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that conversion to and from Ethernet physical layers is inefficient. A great deal of hardware is required for conversion of data to and from lower Ethernet layers, when only the data being sent in the Ethernet packet is truly useful to the blade computers. However, Ethernet is such a widely used standard for communication that much existing software expects to use Ethernet when communicating with other processors, such as in a cluster of computers or a blade system.

Since it would be expensive to re-write existing software that may run on blade processors, Ethernet may likely continue to be the primary standard used for inter-processor communications in blade systems. Ethernet MAC addresses are used by software to identify other blade processors in a blade system. Thus Ethernet MAC addresses are needed for routing data among processors in a typical blade system.

Since each blade board uses the same local bus, such as PCIE, ideally data would be transferred from blade board to other blade boards using PCIE. Unfortunately, since each processor has its own address domain, and each PCIE bus can operate in only one address domain, two processors with two different address domains cannot be directly connected together with a PCIE bus.

New memory address diagnostic protocols such as Advanced Switching (AS) may be used between different address domains. However, since software already uses Ethernet MAC addresses to identify other processors in the blade system, using AS/PCIE could require additional software to manage the AS Fabric, and to enable exchanges of data. Should Ethernet format be used, additional Ethernet-specific protocol extensions are needed on top of the AS interface.

Figure 4:
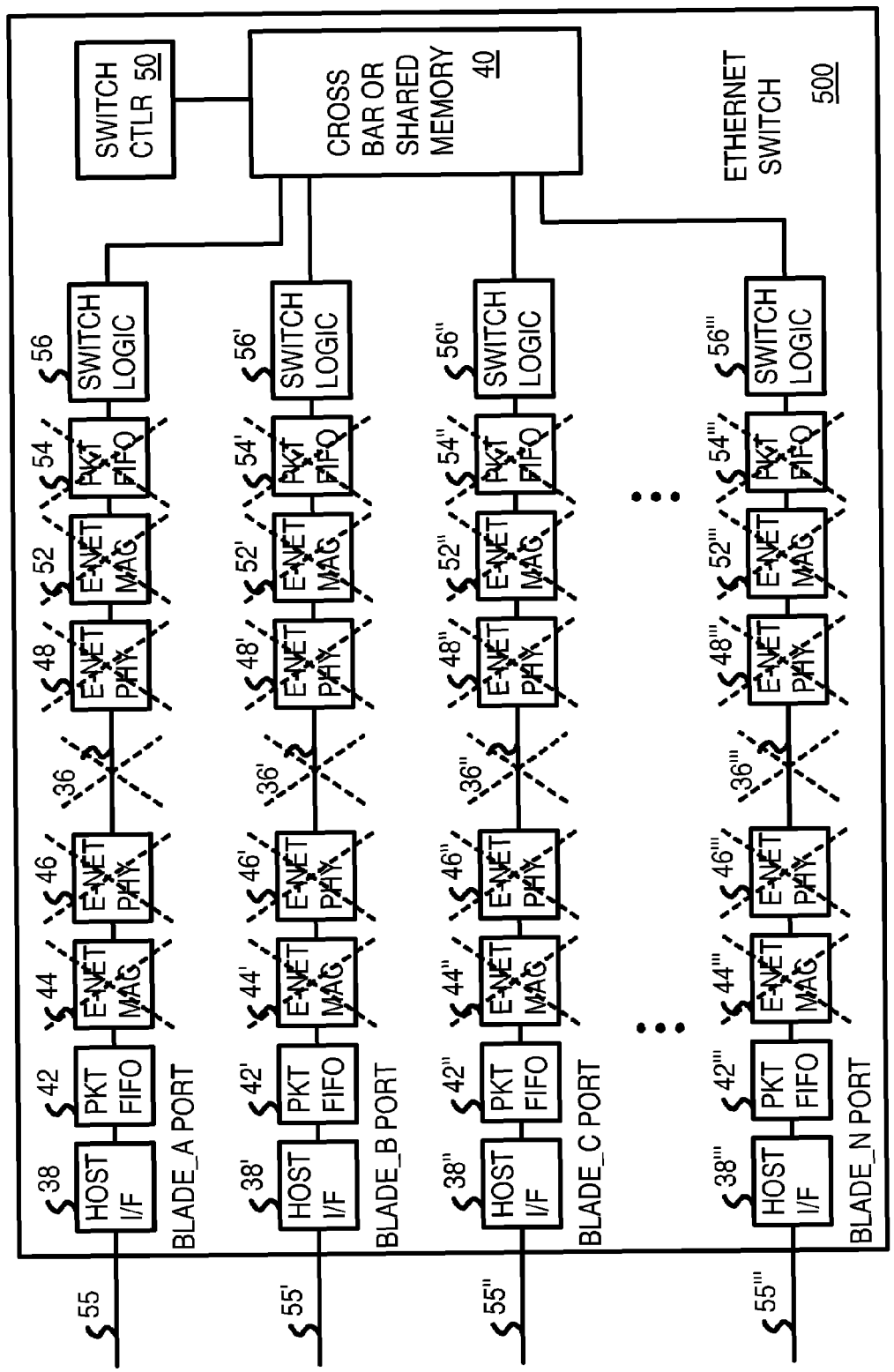
FIG. 4 highlights redundant hardware in a blade system.

Still, the inventor realizes that much hardware is wasted in using Ethernet for communication in a typical blade system. FIG. 4 highlights redundant hardware in a blade system. This redundant hardware is needed for physical-layer Ethernet packet transmission between blade boards and the Ethernet switch.

If the Ethernet physical layer used over Ethernet physical links 36, 36', 36", 36''' could be eliminated, blade Ethernet physical layers 46, 46', 46", 46''' and switch Ethernet physical layers 48, 48', 48", 48''' could both be eliminated. Also, blade-side Ethernet MAC's 44, 44', 44", 44''' and Switch Ethernet MAC's 52, 52', 52", 52''' could also be eliminated since the physical "Medium" in "Medium Access Control" (MAC) has been eliminated. There is no need for flow-control or other management functions for the missing Ethernet media. Finally, since blade packet FIFO 42 and switch packet FIFO 54 are both FIFO's storing the same higher-level Ethernet data, one of these redundant FIFO's may be eliminated. Thus switch packet FIFO's 54, 54', 54", 54'" may be eliminated.

Figure 1:
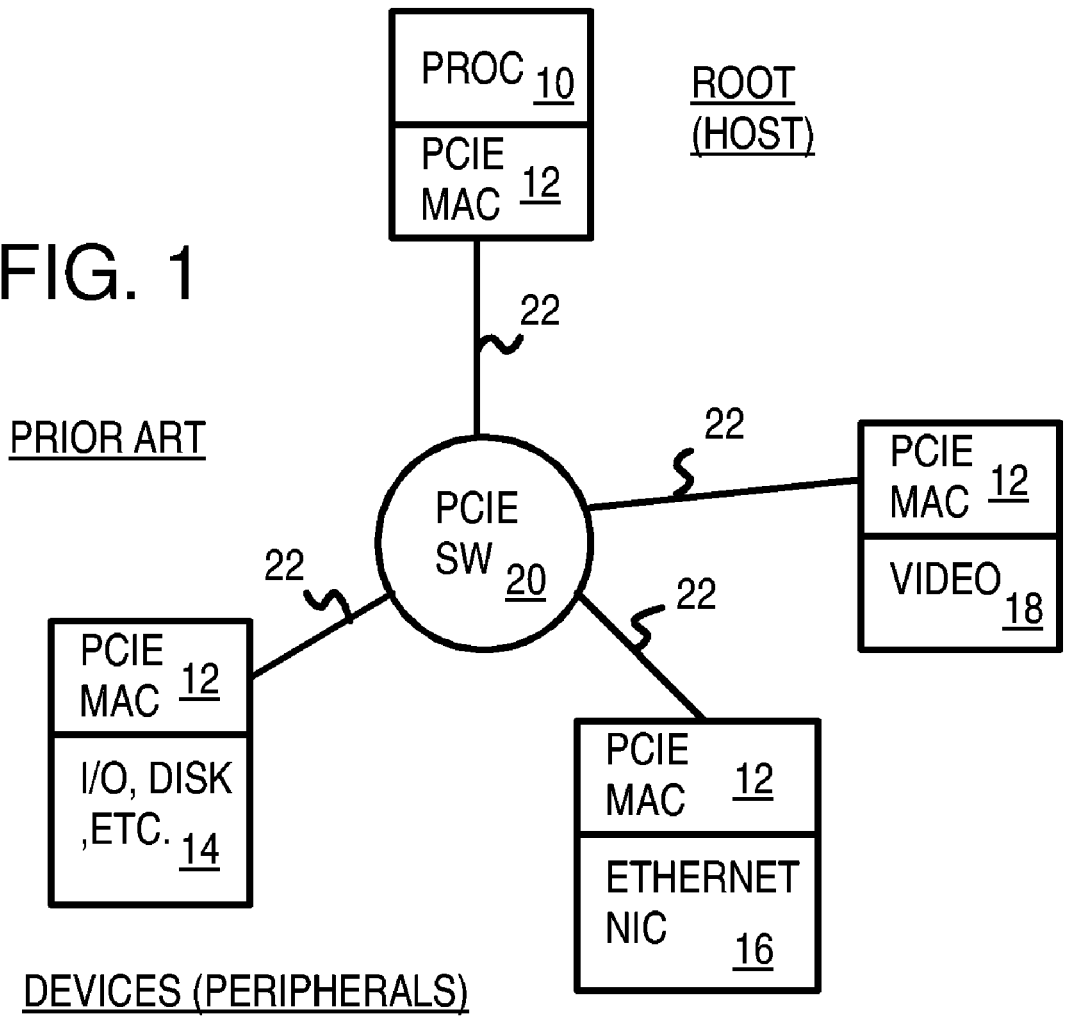
FIG. 1 shows a PC connecting to peripherals using a PCIE switch.
Figure 2:
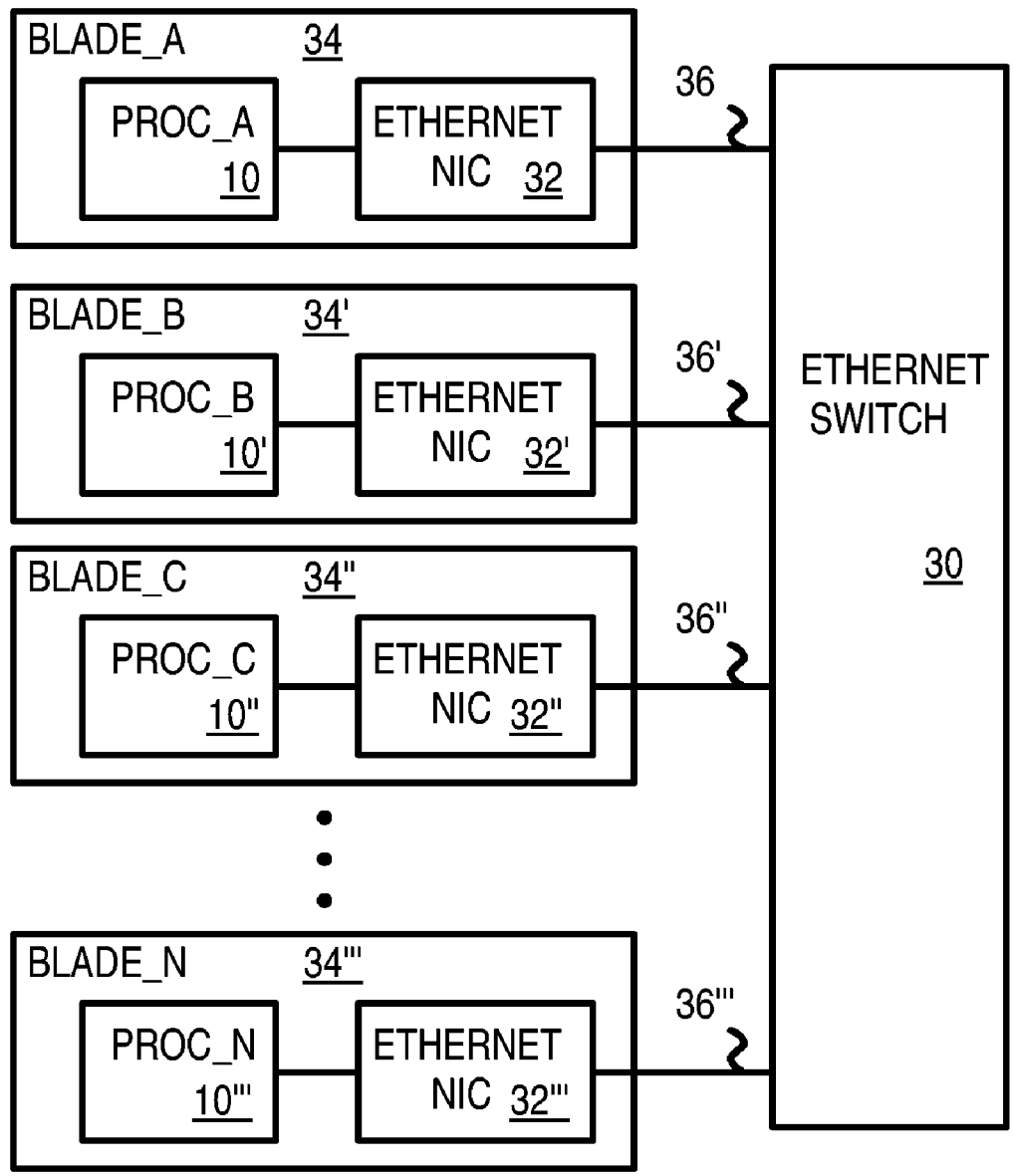
FIG. 2 shows a blade server using an Ethernet switch to connect blades.
Figure 3:
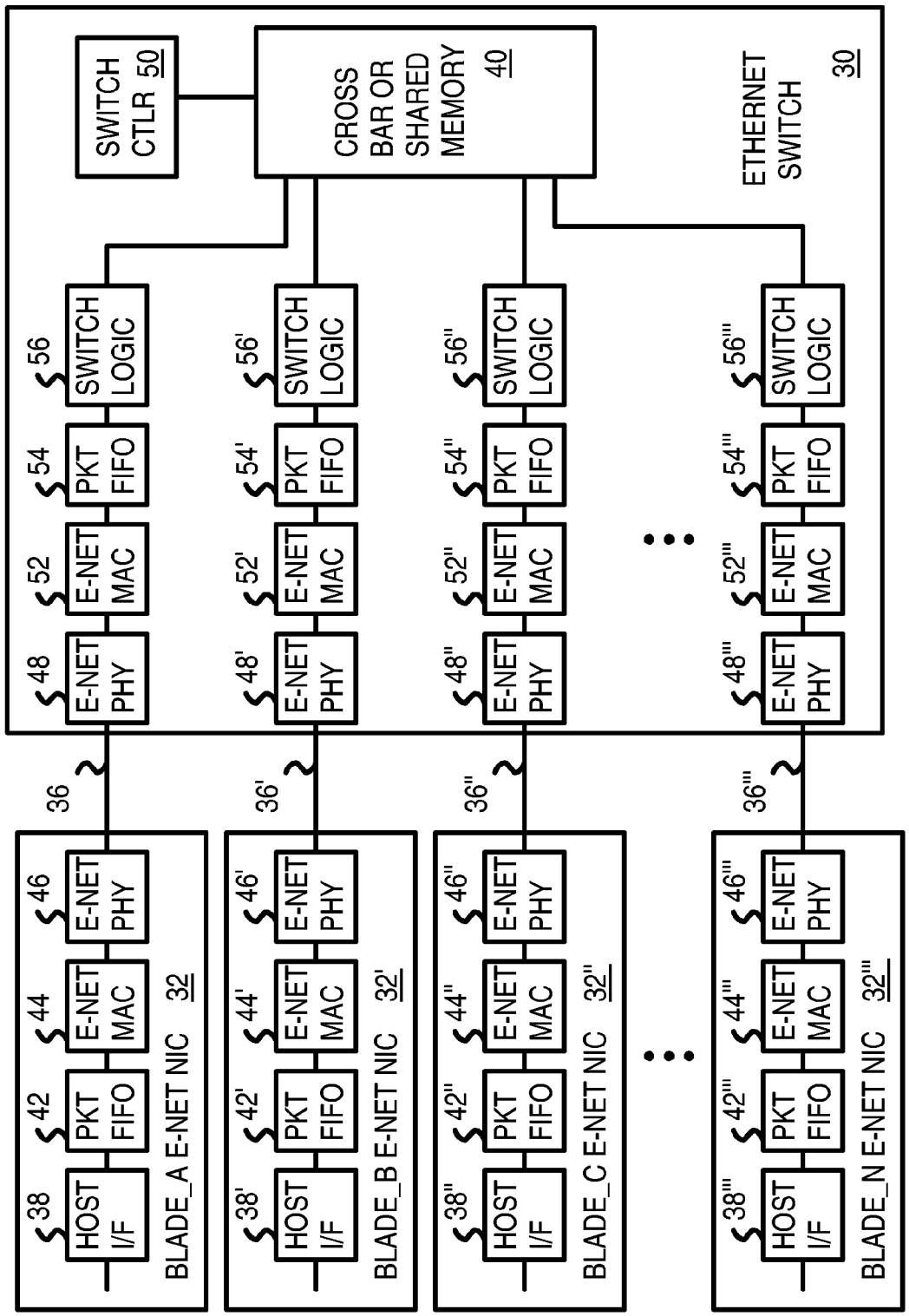
FIG. 3 illustrates in more detail Ethernet hardware in a blade system.

A large amount of hardware is thus redundant and could be eliminated by eliminating the Ethernet physical-link between blade boards and the Ethernet switch. FIG. 4 shows this redundant hardware being X'ed out. Pseudo-Ethernet switch 500 eliminated this redundant hardware by having PCIE ports as inputs to the switch, rather than physical-layer Ethernet ports as in the prior-art of FIG. 3.

Pseudo-Ethernet switch 500 still performs switching of Ethernet packets using cross-bar 40. Switch controller 50 receives link requests from switch logic 56 from an input port, and looks up the destination Ethernet MAC address in a routing table to determine which of the switch's output ports to route the Ethernet packet to. Switch controller 50 then configures the link from input port to output port through cross-bar 40, and the Ethernet packet flows from the input port's packet FIFO 42, through switch logic 56, into cross-bar 40, and back out the output port's switch logic 56' and into its packet FIFO 42'.

Rather than have physical-layer Ethernet ports, Pseudo-Ethernet switch 500 has PCIE ports for cables from each blade board. PCIE physical link 55 connects from a PCIE bus connector on blade A's blade board to a port connector on Pseudo-Ethernet switch 500 for port A. The signal from PCIE physical link 55 is sent to host interface 38, which stores input data into packet FIFO 42, and can send output data from packet FIFO 42 over PCIE physical link 55 to the processor's memory on blade board A.

A standard PCIE trace on a FR4 printed circuit board is about 20 inches long. The length can be longer when higher precision PCB materials other than FR4 are used. The signal can also be carried between PCB using copper cable. For longer distances and superior noise characteristics, an optical interface may be used to carry the electrical signal. Where physical connection is not possible, wireless interface may be used instead.

The blade computer boards and pseudo-Ethernet switch 500 use PCIE physical links to connect to each other. Communication between different chassis of blades may use copper cable or optical fiber. Other blade boards also have PCIE traces or links 55', 55", 55'" that connect to ports on pseudo-Ethernet switch 500. Non-processor-based blades may also use PCI Express physical links to connect to the pseudo Ethernet switch. Ports are typically bi-directional and can act as either an input port or as an output port for a particular packet.

Each port on Pseudo-Ethernet switch 500 contains host interface 38, packet FIFO 42, and switch logic 56, but does not need Ethernet MAC 44, blade Ethernet physical layer 46, Ethernet physical link 36, switch Ethernet physical layer 48, Switch Ethernet MAC 52, and switch packet FIFO 54.

Figure 5:
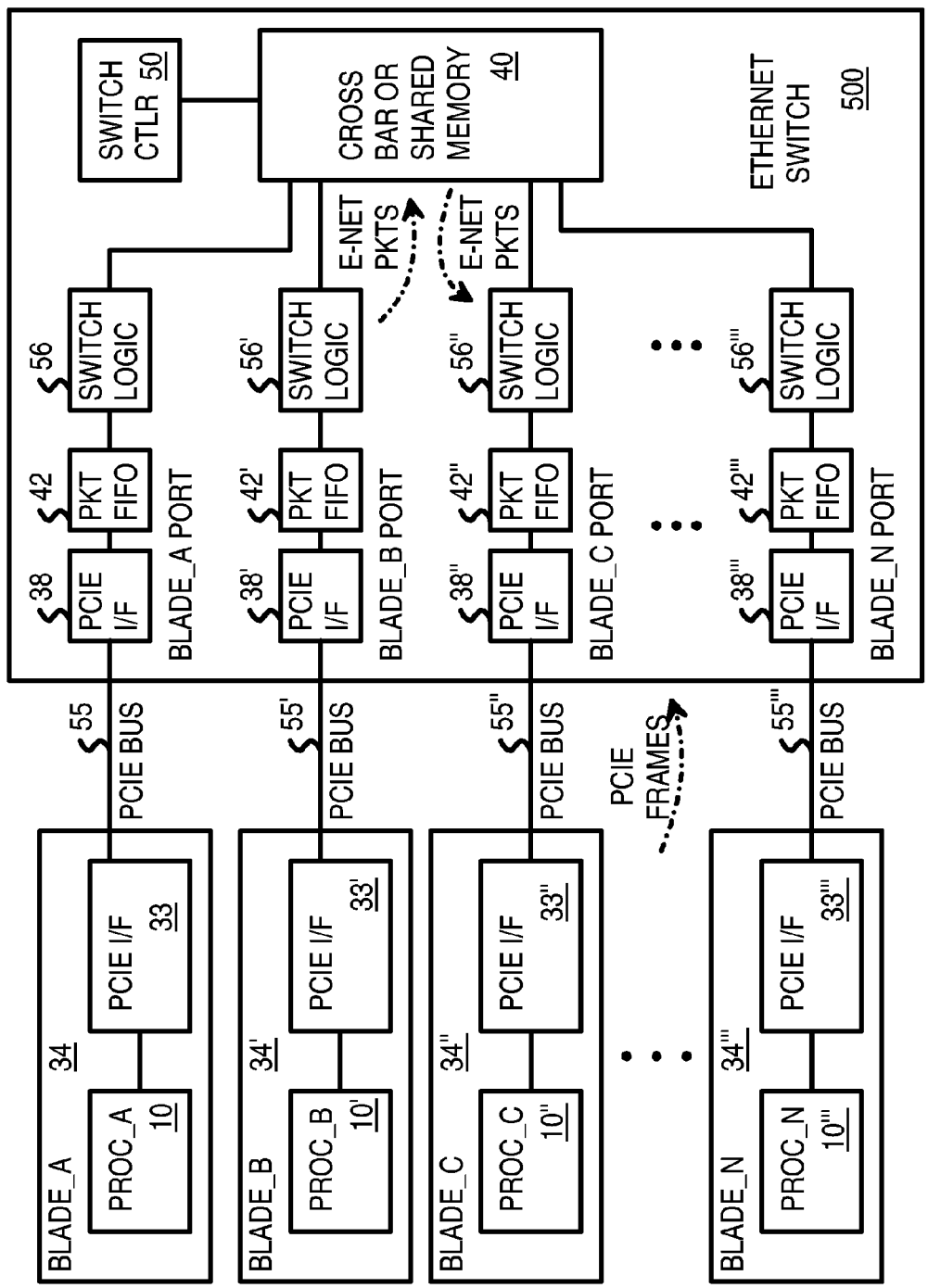
FIG. 5 shows a Pseudo-Ethernet switch connected to blade-processor boards by PCIE physical links.

FIG. 5 shows a Pseudo-Ethernet switch connected to blade-processor boards by PCIE physical links. Blade A on first blade board 34 has processor 10 that can send Ethernet packets onto a PCIE bus through PCIE interface 33. PCIE interface 33 buffers the data and drives it over PCIE physical link 55 to Pseudo-Ethernet switch 500.

Other blade boards 34', 34", 34'" also have processors 10', 10", 10'" and PCIE interfaces 33', 33", 33'" that drive PCIE physical links 55', 55", 55'", respectively. Data may be sent bi-directionally.

Pseudo-Ethernet switch 500 contains several input-output ports. Each port may connect to a blade board through a PCIE physical link 55, 55', 55", 55'". Unconnected ports may be available for later expansion of the blade system by adding more blade processor boards.

Each input-output port on Pseudo-Ethernet switch 500 has host interface 38 that drives and receives signals from PCIE physical link 55, packet FIFO 42 to store the data, and switch logic 56 to send and receive data through cross-bar 40.

Pseudo-Ethernet switch 500 switches using Ethernet MAC addresses for routing. The destination Ethernet MAC address is extracted from the Ethernet packet by switch logic 56 and sent to cross-bar 40, which looks up the destination Ethernet MAC address in a routing table or similar logic. An identifier for the output port on Pseudo-Ethernet switch 500 that receives packets for that Ethernet MAC address is obtained. The identifier could be a simple binary number that identifies one of the output ports. Switch controller 50 then configures cross-bar 40 for the connection, such as by enabling switches in a cross-bar switch, or by passing pointer values that point to the location of input packet FIFO 42 in a large shared memory. The pointer is passed to the output port as the location of its output packet FIFO 42' in the shared memory.

The Ethernet packet data is then sent across cross-bar 40, from input switch logic 56 to output switch logic 56' and stored in output packet FIFO 42'. The output port's host interface 38' then sends the data over PCIE physical link 55' to the destination's blade board 34', where PCIE interface 33' receives the data and writes it to the memory of processor 10'.

While Ethernet MAC addresses are used to switch data through cross-bar 40 in Pseudo-Ethernet switch 500, the input and output ports of Pseudo-Ethernet switch 500 use a different bus, PCI-Express. Data transferred over the external links of PCIE physical links 55, 55', 55" does not use this Ethernet MAC address for routing. Instead, a memory address is used to determine where to write or read the data to in the blade processor's memory. This memory address is sent as part of the PCIE packet or frame.

Thus Ethernet packets are internally switched using Ethernet MAC addresses within Pseudo-Ethernet switch 500, but PCIE frames are read and written to the blade processor's memory over PCI-Express buses, which may include external cable links from Pseudo-Ethernet switch 500 to the blade boards.

Figure 6:
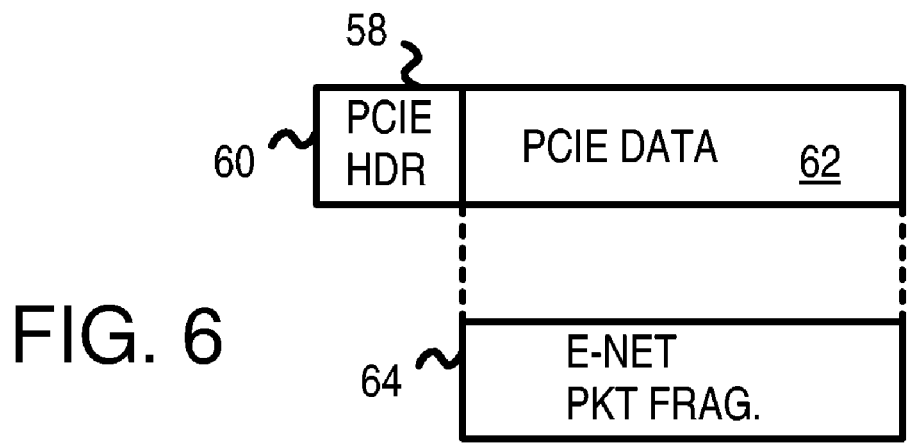
FIG. 6 shows encapsulation of a portion of an Ethernet packet by a PCIE frame or PCIE packet.

FIG. 6 shows encapsulation of a portion of an Ethernet packet by a PCIE frame. PCIE frame 60 can carry data in data payload 62 that is read or written to memory or I/O addresses. Ethernet data such as Ethernet packet fragment 64 can be carried in PCIE data payload 62. PCIE header 58 is attached to payload 62 to form PCIE frame 60.

Other Ethernet data may also be carried by data payload 62. For example, Ethernet commands that are normally written into Ethernet control registers may be carried in data payload 62, or status or configuration data from an Ethernet status register. Pointers to buffers in the main memory may also be carried by data payload 62 and written into other Ethernet pointer registers. Ethernet packet data may be fragmented and carried in several different PCIE packets and read or written to locations identified by the pointers.

Figure 7:
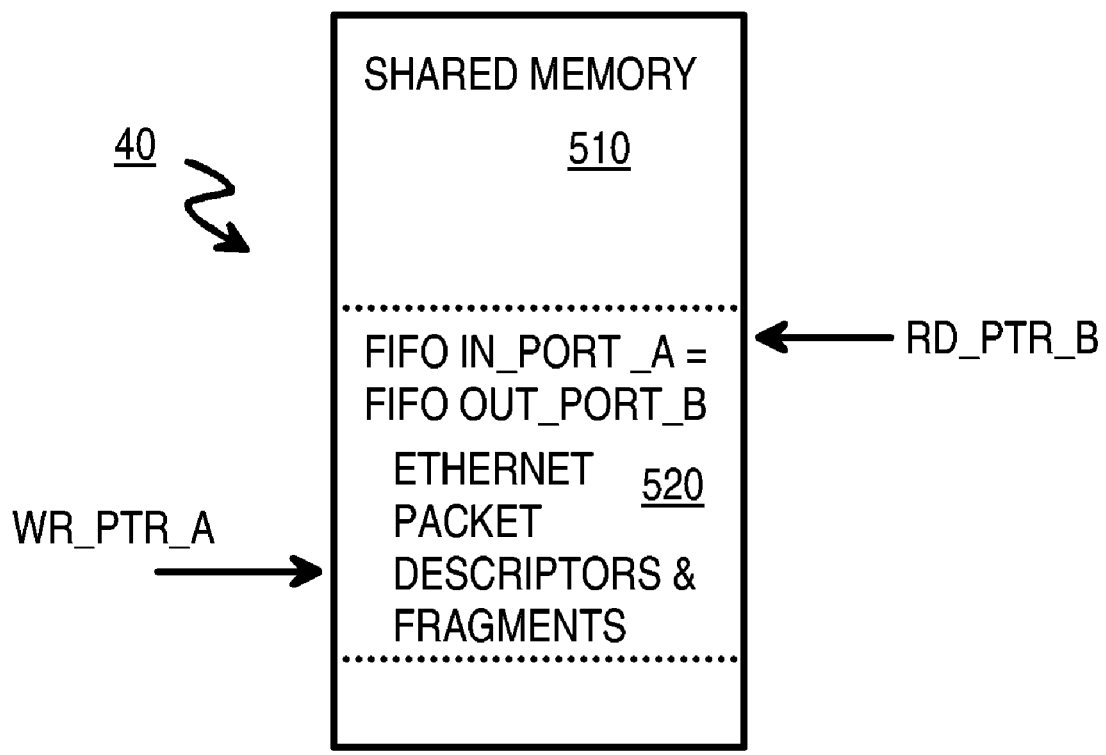
FIG. 7 illustrates that a shared memory may be used as the cross-bar in the Pseudo-Ethernet switch.

FIG. 7 illustrates that a shared memory may be used as the cross-bar in the Pseudo-Ethernet switch. Rather than use a hardware cross-bar switch or fabric, cross-bar 40 may be implemented as shared memory 510 for transferring Ethernet packets from an input port to an output port. Using a shared memory is efficient for smaller switches, when the total bandwidth required is less than the memory bandwidth, but may become a bottleneck for larger numbers of ports requiring more bandwidth. Multi-port memories may reduce contentions and latency delays.

Shared memory 510 is a large memory that can be written and read by all ports in Pseudo-Ethernet switch 500. Rather than write received data into input packet FIFO 42, host interface 38 writes the data directly into shared memory 510 at a location indicated by a write pointer for that port, such as WR_PTR_A for port A. This location is in buffer space 520.

The data written into buffer space 520 in shared memory 510 may include descriptors and data fragments for the Ethernet packet. The descriptors include the length of the Ethernet Packet and other control information and flags to facilitate the switching function. Once the entire Ethernet packet has been received and written into buffer space 520, the pointer is sent to host interface 38' on the output port. Output-port host interface 38' uses the pointer to obtain the Ethernet data, and sends the data to the receiving host.

Rather than have a single pointer, multiple pointers may be used, such as a linked list of buffers that contain packet fragments. Also, rather than wait for the entire Ethernet packet to be written into the shared memory, the pointer can be sent to the output port to begin reading the packet. Separate FIFO's or data-path registers and buffers may be used in addition to buffer space 520 to improve data flow.

Figure 8:
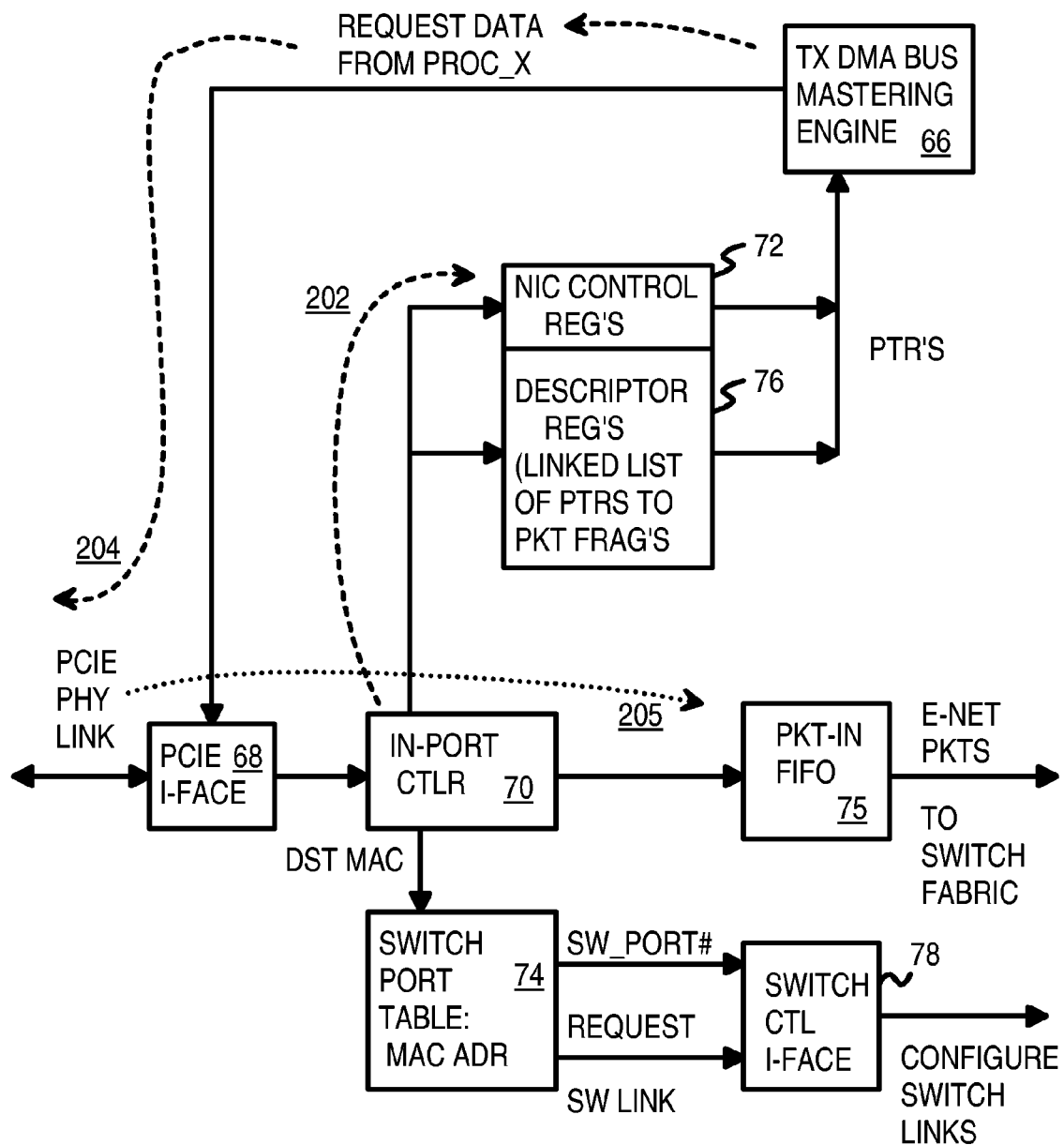
FIG. 8 shows PCIE input-port logic in the Pseudo-Ethernet switch.

Input-Port Logic—FIG. 8

FIG. 8 shows PCIE input-port logic in the Pseudo-Ethernet switch. Each PCIE port on the Pseudo-Ethernet switch may contain input-port logic 100, shown in FIG. 8, and output-port logic 102 shown in FIG. 9. The input port receives parts of an Ethernet packet over a PCIE link which may include a PCIE cable, PCB traces, PCB connectors, etc. Ethernet NIC commands to assemble and transmit Ethernet packets are received over the PCIE input link from a host processor such as on a blade processor board. The Ethernet NIC commands and Ethernet packet data fragments are encapsulated in the data payload of PCIE packets.

PCIE interface 68 sends and receives PCIE packets over the PCIE cable. Input-port controller 70 writes and reads from Ethernet NIC control registers 72, depending on the read/write functions of the PCIE packet.

A variety of information may be contained in the PCIE packet's data payload that is received by the PCIE interface and written to Ethernet NIC control registers 72. For example, a transmit-buffer pointer may be written to control registers 72, along with a "go" or transmit-now command to a command register. The transmit-now command activates transmit DMA bus-mastering engine 66. The transmit-buffer pointer from control registers 72 is used by transmit bus-mastering engine 66 to send read requests (step 204) to the PCIE bus's host processor on the blade processor board. These read requests are encapsulated inside PCIE packets by PCIE interface 68.

The read-request PCIE packet is sent by PCIE interface 68 back over the PCIE cable to the blade's host processor. The host processor (or a direct-memory access (DMA) engine at the host's memory) replies to the PCIE packet's request by reading the data from the processor's memory at a location specified by the transmit-buffer pointer and sends the requested data back to pseudo-Ethernet switch 500 in a reply PCIE packet.

In step 205, the reply data in the reply PCIE packet is extracted by PCIE interface 68 and input-port controller 70 stores the Ethernet data in packet input FIFO 75 or in other buffer memory as the Ethernet packet is being formed. The source and destination MAC addresses are usually part of the pre-formatted Ethernet packet fragments generated by the blade processor. Once the Ethernet packet is formed, it is ready to send to the cross-bar switch for switching to the output port.

When a transmit-now command is written into Ethernet NIC control registers 72, it activates the transmit DMA engine in 66. The reply packet to the PCI Express read command is received from the host sending the Ethernet Packet. When the packet comes in, a copy of the destination MAC address is captured by input port controller 70 and is sent to switch routing table 74.

Switch routing table 74 can be a shared table used by switch controller 50 of FIG. 5. Switch routing table 74 returns the output port number or identifier for a matching entry. A request for creation of a link from this input port to the output port matching the Ethernet MAC address in switch routing table 74 is sent by switch control interface 78 to the switch controller to configure the switch link through the cross-bar.

The process of transmit bus-mastering engine 66 requesting data (step 204) and reply PCIE packets being received, step 205, may be repeated several times. Multiple packets may be formed and sent. The transmit-pointer from Ethernet NIC control registers 72 may first be used to read a descriptor, and then the descriptor points to data fragments that are sent as data in the Ethernet packet.

Figure 9:
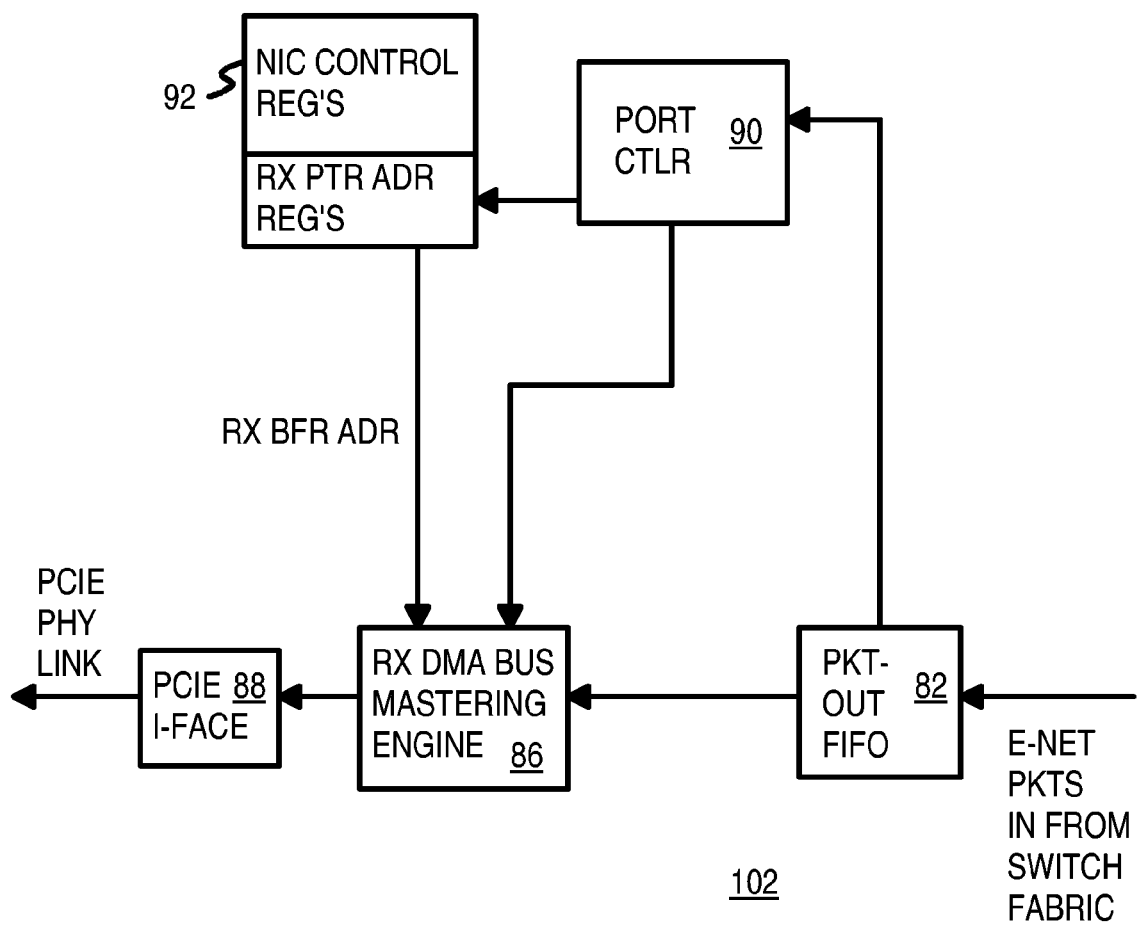
FIG. 9 shows output-port logic in the Pseudo-Ethernet switch.

Output-Port Logic—FIG. 9

FIG. 9 shows output-port logic in the Pseudo-Ethernet switch. Output port logic 102 receives Ethernet packets from cross-bar 40 inside Pseudo-Ethernet switch 500 of FIG. 5 and sends the Ethernet packet to a blade processor over a PCIE bus.

Packet output FIFO 82 receives Ethernet packets switched through the cross-bar or switch fabric from an input port in Pseudo-Ethernet switch 500.

The destination MAC address from packets received by packet output FIFO 82 has already bee looked up in switch routing table 74 by the input port. Once the entire Ethernet packet or one or more fragments have been received by packet output FIFO 82, port controller 90 is activated to begin transmitting the Ethernet packet to the host (blade) processor.

Port controller 90 reads information from Ethernet NIC control registers 92 for this port. Ethernet NIC control registers 92 have previously been written by this port's host processor with one or more receive-buffer pointer addresses, which are address pointers to buffer locations in the host processor's memory that can receive Ethernet packet data.

Receive-buffer pointer, RX_BFR_ADR that is sent to receive DMA bus-mastering engine 86. Receive DMA bus-mastering engine 86 sends received packet data from FIFO 82 to the host processor using PCIE packets. The receive-buffer pointer, RX_BFR_ADR from Ethernet NIC control registers 92 is sent with the PCIE packet to tell the host processor or its DMA engine where in memory to write the received packet data to.

PCIE interface 88 sends the PCIE packets over the PCIE cable link to the to the blade's processor. The Ethernet packet data in the PCIE packets are written into memory on the blade processor board at the location specified by the receive-buffer pointer. Several pointers may be used for large Ethernet packets that are stored in several fragments.

Figure 10:
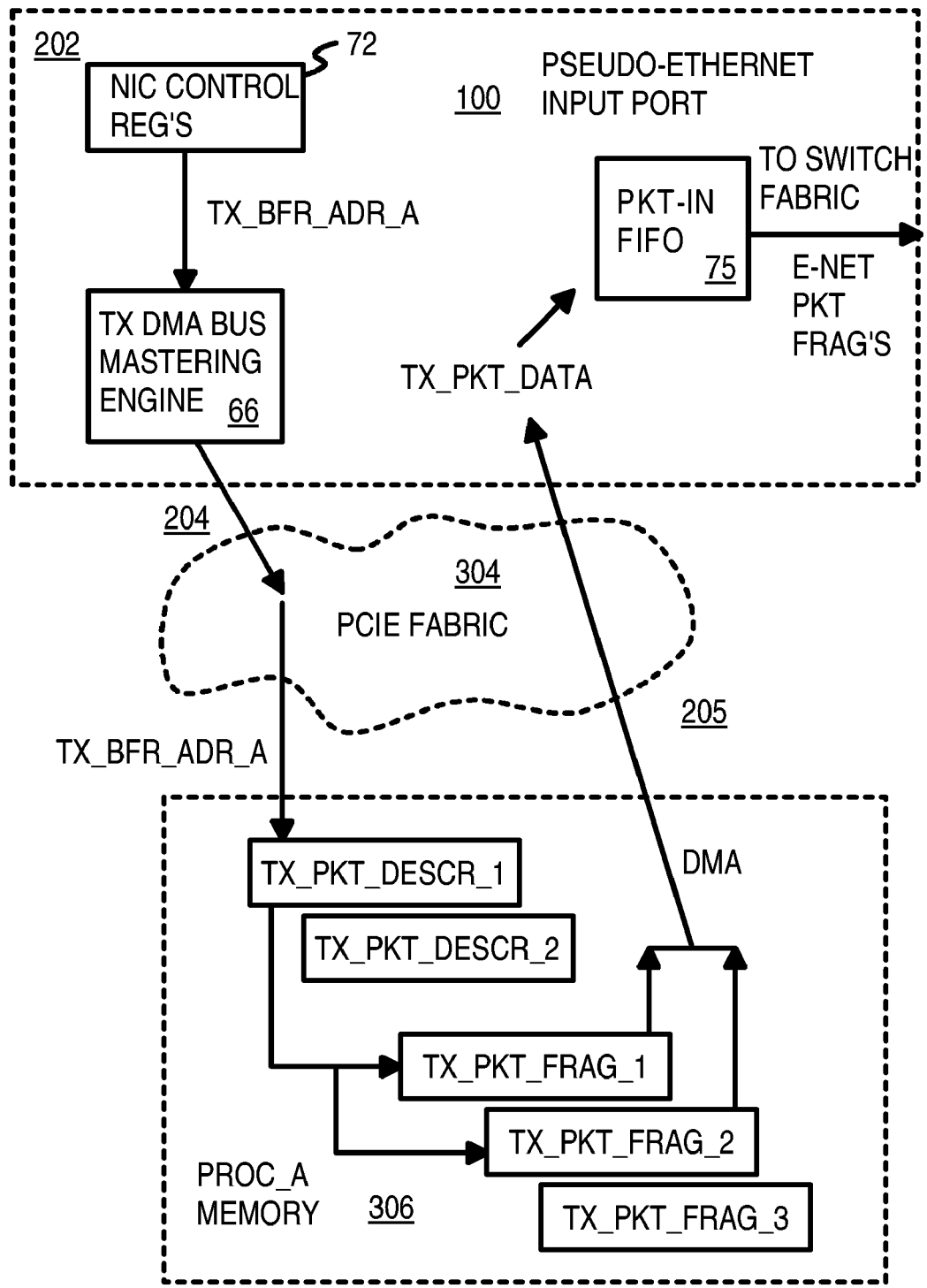
FIG. 10 highlights building and transmitting an Ethernet packet.

FIG. 10 highlights building and transmitting an Ethernet packet. A host (blade) processor writes to Ethernet NIC control registers 72 (step 202 of FIG. 8) by sending PCIE packets to input port logic 100 of Pseudo-Ethernet switch 500. A transmit buffer pointer TX_BFR_ADR_A is written to context registers 72. After a transmit-now command is written to context registers 72, transmit DMA bus-mastering engine 66 sends a request to the host processor for the data to transmit inside the Ethernet packet. Transmit DMA bus-mastering engine 66 reads the transmit buffer pointer TX_B-FR_ADR_A from context registers 72 and sends a request to the host processor inside a PCIE packet that is sent through PCIE fabric 304 (step 204).

While a single PCIE physical link 55 has been described earlier for each link between a blade processor board and a port on Pseudo-Ethernet switch 500, a more complex PCIE fabric could be used. For example, one or more PCIE switches may be inserted into the path between the host processor's PCIE interface and PCIE physical link 55. The PCIE switch may be on the blade processor board or in another location.

Once the PCIE packet is received by the host processor, the host processor, or its DMA engine, reads its processor memory 306 at the location indicated by transmit buffer pointer TX_BFR_ADR_A. This is the location of a transmit descriptor, TX_PKG_DESCR_1. The transmit descriptor has information describing the Ethernet packet to be transmitted, and may include a destination address, data length, sequence number, etc.

The transmit descriptor can be sent back to Pseudo-Ethernet switch 500 through PCIE fabric 304 inside a reply PCIE packet. The descriptor information can be stored in a buffer on Pseudo-Ethernet switch 500. The transmit descriptor also contains pointers to packet fragments in processor memory 306. Transmit DMA bus-mastering engine 66 can then form additional PCIE packets with these pointers, requesting that data in these packet fragments be sent over PCIE fabric 304 to Pseudo-Ethernet switch 500 from processor memory 306 (step 205).

The packet fragment data, TX_PKT_DATA, read from processor memory 306 is sent through PCIE fabric 304 to Pseudo-Ethernet switch 500. Pseudo-Ethernet switch 500 then assembles the data into one or more Ethernet packets for the processor into packet input FIFO 75 on Pseudo-Ethernet switch 500. The Ethernet packet is then sent through cross-bar 40 to the output port on Pseudo-Ethernet switch 500 (FIG. 5).

A processor traditionally writes to registers on a NIC or Ethernet controller that is installed in an expansion bus on the local PC, such as an AT or PCI bus. The Ethernet NIC has a set of several registers, including a command register, a status register, and pointer registers that contain address pointers to buffers in the processor's memory (such as main-memory DRAM on a PC). The buffers in main memory include a receive buffer that receives Ethernet data from incoming Ethernet packets, and transmit buffers that contain packet descriptors and fragments of outgoing Ethernet packets that have not yet been collected by the Ethernet NIC for transmission.

Rather than have these Ethernet register close to the host processor, on a local expansion bus, these registers are more remote from the host processor. These Ethernet registers reside on Pseudo-Ethernet switch 500, which is separated from the host processor by PCIE physical link 55 and are on two different boards and different chassis slots in a blade system. The host processor writes to these registers by sending PCIE packets, with the PCIE address location of the Pseudo-Ethernet switch, through the PCIE fabric or cable to Pseudo-Ethernet switch 500 (FIG. 5).

FIG. 11 shows Ethernet registers for a switch-port context. Each host processor typically operates in a separate context or address space. Processor A writes to a first set of Ethernet registers, CTL_REGS in control registers 72 in its address space. These control registers are typically on the Ethernet NIC on the blade processor board, but with the invention the data written into these registers is copied over PCIE physical link 55 to control registers 72 in port A's address space on Pseudo-Ethernet switch 500.

Other blade processors have their own address spaces and write to different sets of Ethernet registers for their ports on Pseudo-Ethernet switch 500. These are separate address spaces, kept separate by Pseudo-Ethernet switch 500. Each set of control registers 72 contains the standardized Ethernet NIC registers, such as a command register, a status register, a transmit-buffer-pointer register, and a receive-buffer-pointer register.

Switch routing table 74 is a look-up table that contains information associating an Ethernet MAC address with each port's blade processor. For example, one entry in switch routing table 74 is an entry for blade A, which is connected to switch port A. MAC address MAC_A is the Ethernet MAC address assigned to packets for blade A.

FIG. 12 shows lookups in the switch routing table for Ethernet packets. After blade boards are connected by PCIE physical links 55 to Pseudo-Ethernet switch 500, entries are established in switch routing table 74 for the blade processors. For example, blade processor A is connected to port A, with is Ethernet MAC, MAC_A, stored in its entry in switch routing table 74. Likewise, processor B is connected to port B, with its Ethernet MAC address, MAC_B, stored in its entry in switch routing table 74.

Receive (RX) Ethernet Packet

When a packet is received by an input port on Pseudo-Ethernet switch 500 from an external PCIE cable, this incoming or received (Rx) Ethernet packet contains a destination MAC address, MAC_X. This MAC address is extracted from the Ethernet packet and compared to MAC addresses stored in entries in switch routing table 74. The MAC address may be in the packet's descriptor.

When one of the stored MAC addresses in switch routing table 74 matches the received packet's destination Ethernet MAC address, MAC_X, that entry with the matching MAC address is selected. The matching entry also has a switch output port identifier for the output port that receives Ethernet packets for that MAC address.

For example, the destination Ethernet MAC address extracted from the input Ethernet packet, MAC_X, matches MAC_C in switch routing table 74. The port associated with this Ethernet MAC address is OUT_SW_PORT_C. Cross-bar 40 is configured to send the Ethernet packet to output port C.

The control registers for the port C can be read for other information, such as a receive pointer to tell host interface 38" where to store the received Ethernet packet's data in the main memory of the specified blade processor.

FIG. 13 highlights different address-space domains for PCI-Express buses from blade-processor boards to the Pseudo-Ethernet switch. Blade processor A on first blade board 34 connects to switch port A 170 of Pseudo-Ethernet switch 500 over PCIE physical link 55. Data is read from and written to memory on first blade board 34 and in buffers for switch port A 170 by PCIE frames sent over PCIE physical link 55. Even though memory and buffers on first blade board 34 and in buffers for switch port A 170 are on two different boards, they share the same memory space, PCIE address domain 511.

Blade processor A, or a PCIE controller that is controlled by blade processor A, may be considered to be a root of the PCIE bus. Thus PCIE address domain 511 may be considered to be a PCIE root complex.

Likewise, blade processor B on second blade board 34' connects to switch port B 170' of Pseudo-Ethernet switch 500 over PCIE physical link 55'. Data is read from and written to memory on second blade board 34' and in buffers for switch port B 170' by PCIE frames sent over PCIE physical link 55'. Even though memory and buffers on second blade board 34' and in buffers for switch port B 170' are on two different boards, they share the same memory space, PCIE address domain 512.

Similarly, PCIE address domain 514 is a common address space used by the processor N of blade board 34" and switch port N 170". PCIE physical link 55" carries commands to read and write memory addresses that can physically be either on blade board 34" or on switch port N 170" in Pseudo-Ethernet switch 500. The PCIE bus is thus known as a load-sore bus.

Even though PCIE address domains 511, 512, 514 all connect to Pseudo-Ethernet switch 500, the address domains are kept isolated from each other. The address domain ends when PCIE frames are written to buffers in switch port 170, 170', 170". Then an Ethernet packet is formed and transmitted across address-domain boundaries by cross-bar 40, which acts as a separate Ethernet-address domain 590. In Ethernet-address domain 590, Ethernet addresses are used to route packets and determine to which port's buffers the Ethernet packets are written into.

Once the Ethernet packet is switched from one port's address domain to another port's address domain, the Ethernet packet is written to a memory address that is determined by the Ethernet NIC control registers. The receive buffer address within the receiving blade processor's address domain is determined by the receiving blade's processor, not by the sending blade's processor or by the Ethernet packet or its MAC address.

Thus address domains for separate blade processors are kept separate from one another, although their address domains extend into Pseudo-Ethernet switch 500. Pseudo-Ethernet switch 500 isolates address domains from one another.

ALTERNATE EMBODIMENTS

Several other embodiments are contemplated by the inventor. For example while jacks and connectors for PCIE and Ethernet cables and physical links have been described, a wide variety of connectors, jacks, plugs may be used. Rather than use PCIE ports and PCIE cables or physical links, the switch may have ports for other load-store bus protocols, such as any other bus, such as PCI, PCI-X, Hyper Transport, RapidIO, Local Bus, ISA bus (AT bus), CardBus, PCMCIA bus, or other load-store protocol address, memory, or IO bus.

While identical blade-processor boards have been described, the boards in a blade system could vary. Some boards might have additional features. A Blade may contain circuitry and logic without using a processor. Multiple processors may be on a board, or dual-processor chips may be used that share an address space. Several separate blade computers could be integrated together on a single blade board, or occupy a single chassis slot, yet have separate cables to the Pseudo-Ethernet switch, or have a shared Ethernet NIC.

The blade or host processor's memory could be a main memory, DRAM, SRAM, flash, magnetic memory, or other kind of memory controlled by the host processor, directly or indirectly such as through a memory controller or bridge chips. Rather than have ports to host processor boards, other kinds of hosts, such as smart peripherals or comm. devices, may be included.

While an application of the Pseudo-Ethernet switch using blade host-processors in a blade system has been described, other applications for the Pseudo-Ethernet switch may include servers and server farms other than blade servers, other multi-processor or co-processing systems, communications servers and systems, Advanced Telecom Computing Architecture (ATCA) chassis for telecom applications, or other systems that can use Ethernet to communicate.

An output port on Pseudo-Ethernet switch 500 may be assigned a range of MAC addresses, rather than just one. Multiple host processors sharing a port may be supported using multiple contexts. The contexts could be identified by using a context flag or data within the Ethernet packets, such as a context identifier in the Ethernet data. Then the context flag could be stored in switch routing table 74 rather than or in addition to the MAC addresses. A virtual LAN address or identifier (VLAN) could be used to identify among contexts that share a MAC address. A range of MAC addresses could also be used to identify contexts.

While a Pseudo-Ethernet switch using Ethernet MAC addresses for routing has been described, other network protocols could be used for routing. For example, an IP packet format may be used. The routing table could store TCP ports or IP addresses rather than Ethernet MAC addresses and use these for routing. Ethernet packets often carry embedded or encapsulated TCP/IP packets. A combination of MAC and TCP ports could be used for routing, allowing a single Ethernet packet to be divided and sent to different TCP ports. Other combinations are possible too. Protocols that may be used for routing may include Ethernet, TCP/IP, Infiniband, Serial Attached small-computer system interface (SCSI), or SAS, Rapid IO, Serial ATA, Fiber Channel, or other communication protocol which has a certain data packet format that is different from the load-store protocol used in the physical link for the input/output ports to the Pseudo-Ethernet switch.

While using PCIE physical links has been described, wireless links could also be used. Radio-frequency (RF) transceivers could be added for the physical layer of the PCIE link to and from the ports of the Pseudo-Ethernet switch. Other kinds of wireless links such as infrared may be substituted. Optical links may be used.

While a routing table using MAC addresses and switch port identifiers has been described, combinatorial logic such as decode logic could be used to perform the routing lookup function, translating input Ethernet MAC addresses to port identifiers, port enable signals, or other control signals that configure the cross-bar. Destination MAC addresses could be compared and verified at the output ports, or other protocols such as TCP ports or IP addresses could be compared and verified at the output port, even when TCP/IP is not used for routing through the switch fabric. Ethernet packets containing TCP/IP packets that mis-match the TCP port could be discarded by the output port after routing through the switch fabric.

The Pseudo-Ethernet switch could have expansion ports that are connected to external links, such as a LAN link to a workgroup or corporate LAN. These expansion ports could use PCIE, or could be traditional Ethernet ports. An Ethernet MAC and physical layer could be added to each of these expansion or traditional Ethernet ports.

The Pseudo-Ethernet switch may have other added functions, such as a bridge to a wide-area-network (WAN) on one or more of the switch ports. Firewalls, quality-of-service prioritizing of packets, and other functions may also be added.

Ethernet packets may be sent as one unit through the switch fabric, or may be sent through the fabric in piecemeal fashion, such as in multiple data fragments. Packets may be multi-cast to several output ports using a variety of multi-cast techniques.

The correspondence of PCIE packets and Ethernet packets does not have to be one-to-one. Multiple Ethernet packets could fit inside one PCIE packet, or only fragments of one Ethernet packet could fit inside one PCIE packet. The size and exact format of PCIE and Ethernet packets could vary.

Other kinds of switch fabrics, complex or simple, may be substituted. Multi-level switching where several smaller cross-bars are arrayed to form a larger switch fabric may be used as well. Pseudo-Ethernet switch 500 might be integrated on a single large chip, or may be contained on several or many chips. Multiple Pseudo-Ethernet switches could be cascaded together with PCIE or other kinds of links between pairs of Pseudo-Ethernet switch 500.

Round-robin or other kinds or arbitration may be used for contentions in use of the switch fabric between different input ports for the same destination port, or packets from a same port that are queued up. Multiple Ethernet packets could be stored in packet FIFO 42 and re-ordered based on priority or other criteria.

While the term "pseudo" has been used to describe the Pseudo-Ethernet switch and to emphasize that Ethernet MAC and physical layers are missing from the switch, other terms may be used, such as virtual, dual-protocol, PCIE-Ethernet, hidden-Ethernet, missing-MAC, MAC-less, domain-separating, root-isolating, etc.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A dual-protocol switch comprising:

a switch fabric for routing a primary-protocol packet from an input port to a selected output port in response to a primary-protocol destination address of the primary-protocol packet, the primary-protocol destination address determining the selected output port in a plurality of output ports for the primary-protocol packet;

a plurality of external buses for connecting the dual-protocol switch to a plurality of hosts, each external bus in the plurality of external buses for connecting to a host in the plurality of hosts;

wherein the plurality of external buses carry secondary-protocol packets that encapsulate at least portions of primary-protocol packets;

wherein the secondary-protocol packets are formatted for a second protocol while the primary-protocol packets are formatted for a primary protocol, the second protocol and the primary protocol being different network protocols;

a plurality of input ports, each input port for receiving secondary-protocol packets from an external bus in the plurality of external buses, the secondary-protocol packets encapsulating the primary-protocol packets for transport over the external bus;

an input packet memory, for each input port, for storing primary-protocol packets encapsulated in the secondary-protocol packets sent over the external bus;

a secondary-protocol interface for each input port, the secondary-protocol interface transferring the secondary-protocol packets from a memory on the host, over the external bus to the input packet memory for the input port using secondary packets specified by the second protocol; and a switch controller that receives the primary-protocol destination address extracted by an input port from the primary-protocol packet embedded inside the secondary-protocol packet, the switch controller determining a route through the switch fabric from the input port to the selected output port that is selected by the primary-protocol destination address;

wherein the secondary-protocol packets operate within a single host address space for a single host;

wherein the primary-protocol packets operate within multiple address spaces for a plurality of hosts;

wherein the primary protocol is Ethernet and the second protocol is Peripheral Component Interconnect (PCI), PCI-Express, (PCIE), or an extension of PCI or PCIE, and wherein the primary-protocol destination address is an Ethernet media-access controller (MAC) address, whereby the second protocol is a single-address-domain protocol while the primary protocol is a multiple-address-domain protocol, and whereby the dual-protocol switch has PCI-Express ports but switches Ethernet packets using Ethernet MAC addresses, and whereby primary-protocol packets are routed through the switch fabric using the primary-protocol destination address, while input and output ports transfer over the plurality of external buses secondary-protocol packets that encapsulate the primary-protocol packets.

2. The dual-protocol switch of claim 1 wherein the second protocol and the primary protocol are incompatible protocols wherein primary-protocol packets cannot be natively sent over the plurality of external buses unless encapsulated by secondary-protocol packets and secondary-protocol packets cannot be routed through the switch fabric without an address from the primary-protocol packet.

3. The dual-protocol switch of claim 1 wherein the second protocol is a load-store protocol that writes and reads memory locations in a host address space using memory addresses within the host address space;

wherein the primary protocol is a packet-address protocol that does not directly specify host addresses within the host memory space for reading and writing.

4. The dual-protocol switch of claim 1 wherein the plurality of external buses comprise removable PCIE cables that plug into port jacks on the dual-protocol switch and host jacks on host devices in the plurality of hosts, whereby cable connections connect to PCIE ports of the dual-protocol switch.

5. The dual-protocol switch of claim 1 wherein each input port in the plurality of input ports further comprises:
Ethernet network interface controller (NIC) control registers that emulate control registers on an Ethernet NIC card, the Ethernet NIC control registers being written by secondary-protocol packets from a host sent over the external bus.

6. The dual-protocol switch of claim 5 wherein the Ethernet NIC control registers comprise:
a command register to command transmission of an Ethernet packet;
a first transmit-pointer register for locating data fragments to transmit in the primary-protocol packet, the data fragments being stored in the memory of the host; and
a first receive-pointer register for indicating a write location to store data from primary-protocol packet received, the write location being in the memory of the host.

7. The dual-protocol switch of claim 6 wherein each input port in the plurality of input ports further comprises:
a transmit direct-memory access (DMA) bus-mastering engine, receiving a first transmit-pointer from the Ethernet NIC control registers and generating a secondary-protocol packet to fetch a first data fragment from the memory on the host, the transmit DMA bus-mastering engine writing the first data fragment to the input packet memory;
the transmit DMA bus-mastering engine also receiving a second transmit-pointer from the Ethernet NIC control registers and generating a secondary-protocol packet to fetch a second data fragment from the memory on the host, the transmit DMA bus-mastering engine writing the second data fragment to the input packet memory;
wherein the first data fragment and the second data fragment are combined in the input packet memory to assembly the primary-protocol packet for switching through the switch fabric,
whereby data fragments are read from the memory on the host and combined to form the primary-protocol packet routed through the switch fabric.

8. The dual-protocol switch of claim 1 wherein the switch fabric comprises a cross-bar switch with configurable links between input ports and output ports, the configurable links being configured by the switch controller in response to the primary-protocol destination address.

9. The dual-protocol switch of claim 1 wherein the switch fabric comprises a shared memory, the shared memory including a plurality of buffers, each buffer being the input packet memory for an input port sending a primary-protocol packet through the switch fabric;
wherein a pointer to the input packet memory in the shared memory is passed to the selected output port, the selected output port reading the primary-protocol packet from the shared memory at the buffer identified by the pointer,
whereby pointers to buffers in the shared memory are passed to transfer primary-protocol packets from input ports to output ports.

10. The dual-protocol switch of claim 1 further comprising:
a plurality of packet output buffers with a packet output buffer coupled between the switch fabric and each output port, the plurality of packet output buffers storing primary-protocol packets switched through the switch fabric;
a secondary-protocol output interface for each output port, the secondary-protocol output interface encapsulating the primary-protocol packets from the packet output buffer inside secondary-protocol packets, the secondary-protocol output interface driving the secondary-protocol packets over a second external bus in the plurality of external buses, the second external bus coupled to the secondary-protocol output interface, the secondary-protocol output interface writing the secondary-protocol packets to a memory on a destination host,
whereby secondary-protocol packets are sent over the plurality of external buses to destination hosts.

11. The dual-protocol switch of claim 1 further comprising:
a switch routing table having association entries that associate primary-protocol destination addresses with output ports;
a first entry in the switch routing table containing a first association of a first stored primary-protocol destination address with a first output port in the plurality of output ports;
a second entry in the switch routing table containing a second association of a second stored primary-protocol destination address with a second output port in the plurality of output ports;
wherein the switch controller finds a matching entry in the switch routing table, the matching entry having with an association of a stored primary-protocol destination address that matches a primary-protocol destination address extracted by an input port from the primary-protocol packet embedded inside the secondary-protocol packet;
wherein the matching entry has a selected port identifier that identifies the selected output port;
the switch controller determining a route through the switch fabric from the input port to the selected output port using the selected port identifier to identify the selected output port,
whereby the switch routing table is searched for the matching entry to determined the selected output port for the primary-protocol packet.

* * * * *